UNITED STATES PATENT OFFICE.

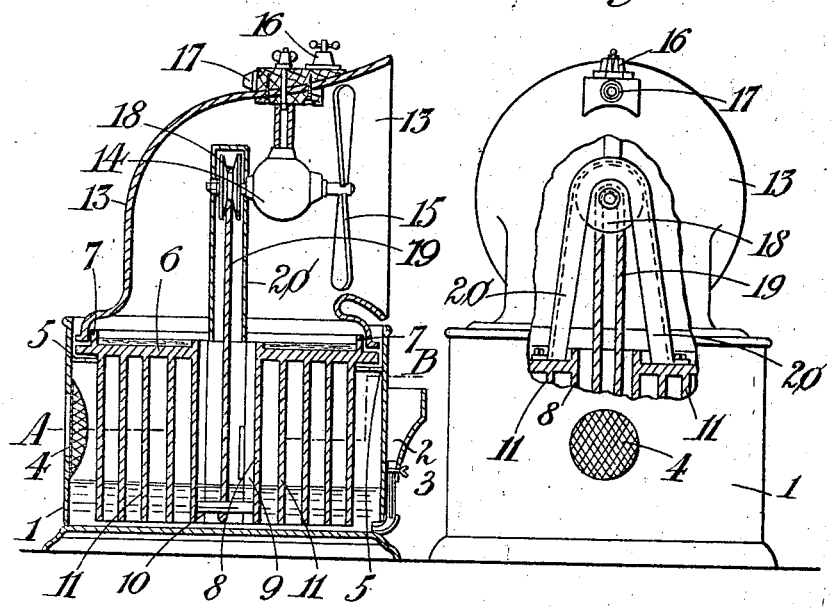

CARL JOST, OF BOMBAY, INDIA.

AIR COOLER AND PURIFIER.

1,016,157.     Specification of Letters Patent.     Patented Jan. 30, 1912.

Application filed December 1, 1910. Serial No. 595,131.

*To all whom it may concern:*

Be it known that I, CARL JOST, a subject of the King of Hungary, residing at Bombay, India, have invented certain new and useful Improvements in Air Coolers and Purifiers, of which the following is a specification.

This invention has reference to air cooling and purifying devices of the type in which the air is drawn or forced by a fan or other means over or past a series of elements of porous material, the latter being kept constantly moist.

The objects of the invention are to provide satisfactory means for controlling and regulating the supply and more particularly for effecting such supply of water or other liquid to the porous elements and further to provide a compact and efficient cooling and purifying device whereby air may be introduced into the room to be ventilated at a very low temperature and in a state which complies with all hygienic requirements.

The above objects are attained by the device illustrated by way of example in the accompanying drawing, in which two constructions are shown.

Figure 1 is a vertical section, Fig. 2 a back view with one part broken off and shown in section, Fig. 3 is a cross-section on the line A—B of Fig. 1 and Fig. 4 is also a cross-section through another construction.

The drawing shows a construction in which a small fan displaces forces or draws the air through a vessel or a series of vessels or cells which has walls always kept moist, so that the air becomes cooled on the said walls, and also deposits on them its impurities such as dust, etc., carried, so that it is introduced into the room to be ventilated at a very low temperature and in a state which complies with all hygienic requirements.

The apparatus comprises two parts which are preferably adapted to be separated for the purpose of examining and cleaning the same. The bottom part 1 of the apparatus which constitutes the cooling and purifying device is provided on one side with a charging device or funnel 2 for the cooling water provided with a water gage glass 3. At another point, the vessel 1 is provided with an opening 4 closed by a wire or gauze grating or an air filtering device.

The vessel 1 is provided near the upper edge with a flange 5 for supporting a cellular element made of porous clay or other material of similar properties. This cellular element consists of a plate 6 which loosely rests on the flange 5 in order that same may be rotated, and is provided with a raised edge 7. The said edge 7, and the portion of the plate projecting beyond the same, are glazed at the upper surface or rendered impermeable to water. In the center, the plate 6 is provided with a cylinder 8 open at the top and at the bottom, the upper edge of which projects slightly from the surface of the plate 6, but not as high as the outer edge 7, in order that the water on the plate 6 should be forced to flow over into the said cylinder before it rises as high as the edge 7. The cylinder 8 is provided with ribs or other means such as grooves 9 between which can be guided downward a roller 10 or a rod rounded off at the bottom made of stoneware or some other suitable material. Around the cylinder 8 concentric cylindrical walls 11 are arranged connected to the upper plate 6 and forming passages open at the bottom. At one point all the cylinders 11 are connected together by means of a partition 12, and the cylinder walls, including the central cylinder 8, are alternately provided at one or at the other side of the partition 12, with passage openings as clearly shown in Fig. 3. In the vessel, water is contained up to a certain level so that the air entering the vessel 1 through the opening 4, has to follow the long path indicated by arrows in Fig. 3 through all the circular passages, before it can pass into the central cylinder 8 and escape at the top. The water contained in the vessel 1, is drawn in by the cellular element, so that the walls are always kept moist. In order to insure this throughout the whole height of the walls, the upper surface of the plate 6 is also provided with water by means of the device hereinafter described, so that the water in question passes from the top into the porous walls.

Fig. 4 of the drawing shows a construction of the cellular element comprising a single wall of spiral form, so arranged that the inlet to the spiral is near the wall of the vessel, and the outlet from the spiral in the center, in which case the central cylinder need not be complete. On the outer free ring or annular flange of the plate 6 is carried a bell mouthed tube 13 which is rotatable with the cellular element, so that its opening can face every way. A fan 15, driven by an electric motor 14 is mounted to work in the opening of the bell mouth. Instead of an electric motor a fan driven in any other manner could be used. The motor 14 is preferably secured to the bell mouth, and the attachment parts carry at the outside a switch 16 and terminals or a plug connection 17. The motor spindle is provided at a point above the central portion 8 of the cellular element, with a pulley 18, the central diameter of which must be very small, but the edges of which have a considerably larger diameter as it is intended to exert centrifugal action. Over the pulley 18 is placed an endless belt, cord or chain 19, made of suitable material (hemp, wool, silk, rubber, metal or the like). This band or cord 19 traveling very slowly owing to the small diameter of the pulley, passes at the other end loosely around the roller or body 10 arranged in the central portion 8. The body 10 may be adapted to participate in the rotation or be fixed, though preferably it should be adapted to be moved up and down. The cord 19 is intended to raise the water from the vessel and to supply it to the upper plate 6 of the cellular element. The speed of the cord 19 and its water conveying capacity are calculated so that it carries upward exactly as much water as is consumed there by evaporation and by absorption by the cellular element. In order to collect the water discharged by the cord 19 on to the pulley 18 and again projected by the latter, and to transfer it to the upper plate 6, there is fixed on the upper plate 6 a U-shaped casing 20 made of plate or other suitable material, the upper portion of which surrounds the pulley 18 in such manner that the water projected is guided downward in the groove. The fan blades 15 draw in air through the conduits of the cellular element and the opening 4. The air is therefore caused to travel a long path between the moist cell walls 11 and is therefore cooled to a low temperature and also finds an opportunity to deposit impurities, etc. The fan can act also so that the air is forced through the conduits. The water to be supplied to the vessel 1, may be cooled with ice, and if desired, mixed with disinfectants or scents, or instead of water, substances of the latter kind can be used.

The device illustrated is intended to represent a table or bracket apparatus, but it can of course be suitably modified for securing to ceilings or walls or mounted in air shafts, fire places, etc. The device can be constructed as a central apparatus having a number of pipes connecting it to each room which it is desired to cool.

What I claim as my invention and desire to secure by Letters Patent is:—

1. In an air cooling and purifying device, a vessel, a cellular element of porous material rotatably mounted therein, a bell-mouthed piece mounted upon said cellular element and rotatable therewith, a fan within said bell mouth, a fan motor, and a water raising device operated by said motor, substantially as described.

2. In an air cooling and purifying device, a vessel having an air suction opening therein, a water charging device for said vessel, a cellular element of porous material rotatably mounted within said vessel, a bell-mouthed piece mounted upon said cellular element and rotatable therewith, a fan within said bell mouth, a fan motor, and a water raising device operated by said motor, substantially as described.

3. In an air cooling device, a tank, a series of vertical partitions of porous material, a porous plate integral with said partitions, a raised outer edge on said plate and an inner edge of less height than said outer edge to form a trough, a bell-mouthed piece mounted upon said plate and outside said outer edge, a fan and motor within said bell mouth, and means operated by said fan motor for supplying water to said trough, substantially as described.

4. In an air cooling device, a tank, a series of vertical partitions of porous material, a porous plate integral with said partitions, a raised outer edge on said plate and an inner edge of less height than said outer edge to form a trough, a bell-mouthed piece mounted upon said plate and outside said outer edge, a fan and motor within said bell mouth, means operated by said fan motor for supplying water to said trough, and means for causing the air forced by said fan to take the longest path between said partitions, substantially as described.

5. In an air cooling and purifying device, a porous cellular element of concentric cylindrical walls, means for causing air to pass therethrough, and a device operated by said means and adapted to supply a cooling liquid to the upper portion of said cellular element.

6. In an air cooling device, a tank, a series of vertical concentric cylindrical partitions of porous material, a porous plate integral with said partitions, a raised outer edge on said plate and an inner edge of less height than said outer edge to form a trough, a bell-mouthed piece carried by said plate and outside said outer edge, a fan and motor within said bell mouth, a small diameter pulley driven by said motor, a circular section body disposed within the central vertical partitions, a band driven by the pulley and passing around said circular section body, and a casing over said band into which the water drawn up by said band is projected and led into said porous trough, substantially as described.

7. In an air cooling device, a tank, a series of vertical concentric cylindrical walls of porous material arranged in the tank, a porous plate integral with said walls, a raised outer edge on said plate and an inner edge of less height than said outer edge to form a trough, a bell-mouthed piece supported by said plate and outside said outer edge, a fan and motor within said bell mouth, a small diameter pulley driven by said fan motor, the central vertical partitions being provided with grooves, a circular section body mounted in the grooves, a band driven by said pulley and passing over the circular section body, and a casing over the band for directing the water drawn up by said band into said porous trough, substantially as described.

In testimony whereof I have signed my name to this specification in the presence of two subscribing witnesses.

CARL JOST.

Witnesses:
 RUDOLPH FRICKE,
 ALBERT R. MORAWETZ.